United States Patent
Park

(10) Patent No.: US 12,554,101 B2
(45) Date of Patent: Feb. 17, 2026

(54) OPTICAL IMAGING SYSTEM

(71) Applicant: Samsung Electro-Mechanics Co., Ltd., Suwon-si (KR)

(72) Inventor: Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 712 days.

(21) Appl. No.: 17/840,910

(22) Filed: Jun. 15, 2022

(65) Prior Publication Data
US 2022/0308321 A1   Sep. 29, 2022

Related U.S. Application Data

(63) Continuation of application No. 16/574,268, filed on Sep. 18, 2019, now Pat. No. 11,391,918, which is a continuation of application No. 15/431,013, filed on Feb. 13, 2017, now Pat. No. 10,845,574.

(30) Foreign Application Priority Data

Aug. 9, 2016 (KR) .................. 10-2016-0101229

(51) Int. Cl.
G02B 9/62 (2006.01)
G02B 13/00 (2006.01)

(52) U.S. Cl.
CPC ........... *G02B 13/0045* (2013.01); *G02B 9/62* (2013.01)

(58) Field of Classification Search
CPC ...... G02B 13/0045; G02B 9/62; G02B 5/282; G02B 27/005
See application file for complete search history.

(56) References Cited

U.S. PATENT DOCUMENTS

| | | |
|---|---|---|
| 9,217,848 B1 | 12/2015 | Chen et al. |
| 2012/0243108 A1 | 9/2012 | Tsai et al. |
| 2013/0070346 A1 | 3/2013 | Hsu et al. |
| 2013/0314804 A1* | 11/2013 | Kubota .................. G02B 5/005 359/757 |
| 2014/0049843 A1 | 2/2014 | Kubota et al. |
| 2015/0042862 A1 | 2/2015 | Huang |

(Continued)

FOREIGN PATENT DOCUMENTS

| | | |
|---|---|---|
| CN | 104503069 A | 4/2015 |
| CN | 104678537 A | 6/2015 |

(Continued)

OTHER PUBLICATIONS

Chinese Office Action issued on Jul. 29, 2019 in corresponding Chinese Application No. 201710187927.4 (6 pages in English, 5 pages in Chinese).

(Continued)

*Primary Examiner* — Balram T Parbadia
(74) *Attorney, Agent, or Firm* — NSIP Law

(57) ABSTRACT

An optical imaging system includes a first lens having a positive refractive power, an image-side surface of the first lens being concave, a second lens, a third lens, an image-side surface of the third lens being concave, a fourth lens, a fifth lens, an image-side surface of the fifth lens being concave, and a sixth lens having a positive refractive power and having an inflection point formed on an image-side surface, wherein an F number of the optical imaging system is lower than 2.2.

13 Claims, 20 Drawing Sheets

(56) References Cited

U.S. PATENT DOCUMENTS

| | | |
|---|---|---|
| 2015/0116844 A1 | 4/2015 | Shih |
| 2015/0153546 A1 | 6/2015 | Tang et al. |
| 2015/0192760 A1 | 7/2015 | Huang |
| 2015/0198791 A1 | 7/2015 | Kubota et al. |
| 2015/0253541 A1 | 9/2015 | Hsu et al. |
| 2015/0319389 A1 | 11/2015 | Huang |
| 2015/0338607 A1 | 11/2015 | Liao et al. |
| 2016/0004040 A1 | 1/2016 | Chen |
| 2016/0033744 A1 | 2/2016 | Tsai et al. |
| 2016/0041368 A1 | 2/2016 | Chen et al. |
| 2016/0062081 A1 | 3/2016 | Kubota et al. |
| 2016/0109688 A1 | 4/2016 | Jo |
| 2016/0154210 A1 | 6/2016 | Baik et al. |
| 2016/0320592 A1 | 11/2016 | Huang |
| 2016/0356989 A1* | 12/2016 | Kubota ............ G02B 9/62 |
| 2017/0184817 A1 | 6/2017 | Lee |
| 2017/0219802 A1* | 8/2017 | Chen ............ G02B 13/18 |
| 2017/0351064 A1* | 12/2017 | Chang ............ G02B 9/60 |
| 2018/0045914 A1 | 2/2018 | Park |

FOREIGN PATENT DOCUMENTS

| | | |
|---|---|---|
| CN | 105319682 A | 2/2016 |
| CN | 105334595 A | 2/2016 |
| CN | 105445898 A | 3/2016 |
| CN | 105717617 A | 6/2016 |
| CN | 206848556 U | 1/2018 |
| JP | 2015-165338 A | 9/2015 |
| TW | 201616177 A | 5/2016 |

OTHER PUBLICATIONS

Chinese Office Action issued on Jan. 15, 2020 in counterpart Chinese Patent Application No. 201710187927.4 (12 pages in English and 9 pages in Chinese).

Chinese Office Action issued on Oct. 11, 2021, in Counterpart Chinese Patent Application No. 202010710468.5 (17 pages in English and 11 pages in Chinese).

Korean Office Action issued Apr. 30, 2018, in corresponding Korean Application No. 10-2016-0101229 (7 pages in English, 4 pages in Korean).

Korean Office Action issued on Oct. 30, 2017 in counterpart Korean Patent Application No. 10-2016-0101229 (12 pages, in Korean with English translation).

* cited by examiner

| FIRST EXAMPLE | | | | | |
|---|---|---|---|---|---|
| F No. = 2.10 | | f = 4.463 | OAL = 5.200 | | |
| NUMBER OF SURFACE | | RADIUS OF CURVATURE | THICKNESS / DISTANCE | REFRACTIVE INDEX | ABBE NUMBER | FOCAL LENGTH |
| S0 | | Infinity | | | | |
| S1 | FIRST LENS | 1.6224 | 0.6197 | 1.546 | 56.10 | 4.263 |
| S2 | | 4.6345 | 0.1157 | | | |
| S3 | SECOND LENS | 5.1245 | 0.2400 | 1.667 | 20.40 | -12.219 |
| S4 | | 3.0871 | 0.1700 | | | |
| S5 | STOP | Infinity | 0.0000 | | | |
| S6 | THIRD LENS | 4.3123 | 0.3819 | 1.546 | 56.10 | 10.509 |
| S7 | | 16.8210 | 0.2879 | | | |
| S8 | FOURTH LENS | -4.7271 | 0.4265 | 1.667 | 20.40 | -95.961 |
| S9 | | -5.2883 | 0.4406 | | | |
| S10 | FIFTH LENS | 17.9773 | 0.6505 | 1.667 | 20.40 | -9.018 |
| S11 | | 4.4414 | 0.1200 | | | |
| S12 | SIXTH LENS | 1.7072 | 0.6406 | 1.536 | 55.70 | 140.017 |
| S13 | | 1.5182 | 0.1952 | | | |
| S14 | FILER | Infinity | 0.2100 | 1.518 | 64.20 | |
| S15 | | Infinity | 0.7013 | | | |
| S16 IMAGING PLANE | | Infinity | 0.0000 | | | |

FIG. 3

| FIRST EXAMPLE | S1 | S2 | S3 | S4 | S6 | S7 | S8 | S9 | S10 | S11 | S12 | S13 |
|---|---|---|---|---|---|---|---|---|---|---|---|---|
| Y RADIUS | 1.622 | 4.635 | 5.124 | 3.087 | 4.312 | 16.821 | -4.727 | -5.288 | 17.977 | 4.441 | 1.707 | 1.518 |
| CONIC CONSTANT(K) | -0.201 | -9.324 | -30.982 | 2.309 | -11.451 | 0.000 | 16.654 | -23.337 | 99.000 | -19.383 | -3.722 | -1.016 |
| 4th-ORDER COEFFICIENT(A) | 0.002 | -0.054 | -0.097 | -0.101 | -0.052 | -0.004 | 0.036 | -0.010 | 0.072 | -0.039 | -0.284 | -0.248 |
| 6th-ORDER COEFFICIENT(B) | 0.023 | 0.058 | 0.136 | 0.122 | 0.034 | -0.143 | -0.247 | -0.244 | -0.238 | -0.006 | 0.122 | 0.111 |
| 8th-ORDER COEFFICIENT(C) | -0.083 | -0.108 | -0.095 | 0.006 | -0.237 | 0.348 | 0.629 | 0.474 | 0.244 | 0.008 | -0.029 | -0.040 |
| 10th-ORDER COEFFICIENT(D) | 0.178 | 0.256 | 0.143 | -0.168 | 0.563 | -0.722 | -1.006 | -0.524 | -0.172 | -0.005 | 0.004 | 0.010 |
| 12th-ORDER COEFFICIENT(E) | -0.214 | -0.415 | -0.267 | 0.241 | -0.758 | 0.845 | 0.999 | 0.348 | 0.073 | 0.001 | 0.000 | -0.002 |
| 14th-ORDER COEFFICIENT(F) | 0.131 | 0.329 | 0.261 | -0.163 | 0.464 | -0.557 | -0.587 | -0.120 | -0.017 | 0.000 | 0.000 | 0.000 |
| 16th-ORDER COEFFICIENT(G) | -0.034 | -0.102 | -0.093 | 0.062 | -0.075 | 0.167 | 0.198 | 0.016 | 0.002 | 0.000 | 0.000 | 0.000 |
| 18th-ORDER COEFFICIENT(H) | 0.000 | 0.000 | 0.000 | 0.000 | 0.000 | 0.000 | -0.022 | 0.000 | 0.000 | 0.000 | 0.000 | 0.000 |
| 20th-ORDER COEFFICIENT(J) | 0.000 | 0.000 | 0.000 | 0.000 | 0.000 | 0.000 | 0.000 | 0.000 | 0.000 | 0.000 | 0.000 | 0.000 |

FIG. 4

| SECOND EXAMPLE ||||||
|---|---|---|---|---|---|
| F No. = 2.10 | f = | 4.475 | OAL = | 5.200 ||
| NUMBER OF SURFACE | RADIUS OF CURVATURE | THICKNESS / DISTANCE | REFRACTIVE INDEX | ABBE NUMBER | FOCAL LENGTH |
| S0 | infinity | | | | |
| S1 FIRST LENS | 1.6354 | 0.6052 | 1.546 | 56.10 | 4.082 |
| S2 | 5.3397 | 0.1345 | | | |
| S3 SECOND LENS | 5.8158 | 0.2400 | 1.667 | 20.40 | -11.752 |
| S4 | 3.2834 | 0.1814 | | | |
| S5 STOP | Infinity | 0.0000 | | | |
| S6 THIRD LENS | 4.3123 | 0.3858 | 1.546 | 56.10 | 12.002 |
| S7 | 5.7597 | 0.2746 | | | |
| S8 FOURTH LENS | 46.4985 | 0.3800 | 1.656 | 21.50 | -428.266 |
| S9 | -4.7448 | 0.4490 | | | |
| S10 FIFTH LENS | -4.9794 | 0.7061 | 1.656 | 21.50 | -8.533 |
| S11 | 18.1283 | 0.1331 | | | |
| S12 SIXTH LENS | 4.2097 | 0.6220 | 1.536 | 55.70 | 1415.861 |
| S13 | 1.6908 | 0.2028 | | | |
| S14 FILER | 1.4770 | 0.2100 | 1.518 | 64.20 | |
| S15 | Infinity | 0.6758 | | | |
| S16 IMAGING PLANE | Infinity | 0.0000 | | | |

FIG. 7

| SECOND EXAMPLE | S1 | S2 | S3 | S4 | S6 | S7 | S8 | S9 | S10 | S11 | S12 | S13 |
|---|---|---|---|---|---|---|---|---|---|---|---|---|
| Y RADIUS | 1.635 | 5.340 | 5.816 | 3.283 | 5.760 | 46.499 | -4.745 | -4.979 | 18.128 | 4.210 | 1.691 | 1.477 |
| CONIC CONSTANT(K) | -0.198 | -8.020 | -30.982 | 2.594 | -11.451 | 0.000 | 16.533 | -23.337 | 99.000 | -19.383 | -3.705 | -1.008 |
| 4th-ORDER COEFFICIENT(A) | 0.001 | -0.054 | -0.102 | -0.097 | -0.039 | -0.002 | 0.024 | -0.001 | 0.056 | -0.036 | -0.269 | -0.255 |
| 6th-ORDER COEFFICIENT(B) | 0.029 | 0.060 | 0.153 | 0.118 | -0.017 | -0.176 | -0.283 | -0.259 | -0.204 | -0.010 | 0.107 | 0.116 |
| 8th-ORDER COEFFICIENT(C) | -0.106 | -0.102 | -0.142 | 0.028 | 0.030 | 0.450 | 0.748 | 0.515 | 0.199 | 0.012 | -0.023 | -0.042 |
| 10th-ORDER COEFFICIENT(D) | 0.228 | 0.211 | 0.232 | -0.250 | -0.084 | -0.938 | -1.328 | -0.599 | -0.130 | -0.006 | 0.003 | 0.011 |
| 12th-ORDER COEFFICIENT(E) | -0.276 | -0.305 | -0.357 | 0.423 | 0.210 | 1.108 | 1.540 | 0.419 | 0.049 | 0.002 | 0.000 | -0.002 |
| 14th-ORDER COEFFICIENT(F) | 0.171 | 0.227 | 0.297 | -0.378 | -0.303 | -0.721 | -1.135 | -0.152 | -0.010 | 0.000 | 0.000 | 0.000 |
| 16th-ORDER COEFFICIENT(G) | -0.044 | -0.069 | -0.097 | 0.153 | 0.173 | 0.207 | 0.500 | 0.021 | 0.001 | 0.000 | 0.000 | 0.000 |
| 18th-ORDER COEFFICIENT(H) | 0.000 | 0.000 | 0.000 | 0.000 | 0.000 | 0.000 | -0.099 | 0.000 | 0.000 | 0.000 | 0.000 | 0.000 |
| 20th-ORDER COEFFICIENT(I) | 0.000 | 0.000 | 0.000 | 0.000 | 0.000 | 0.000 | 0.000 | 0.000 | 0.000 | 0.000 | 0.000 | 0.000 |

FIG. 8

| THIRD EXAMPLE ||||||
|---|---|---|---|---|---|
| F No. = 2.10 | f = | 4.475 | OAL = | 5.200 | |
| NUMBER OF SURFACE | RADIUS OF CURVATURE | THICKNESS / DISTANCE | REFRACTIVE INDEX | ABBE NUMBER | FOCAL LENGTH |
| S0 | Infinity | | | | |
| S1 FIRST LENS | 1.6587 | 0.6191 | 1.546 | 56.10 | 3.986 |
| S2 | 6.0584 | 0.1446 | | | |
| S3 SECOND LENS | 6.4539 | 0.2400 | 1.667 | 20.40 | -10.970 |
| S4 | 3.3780 | 0.1800 | | | |
| S5 STOP | Infinity | 0.0000 | | | |
| S6 THIRD LENS | 5.6339 | 0.3868 | 1.546 | 56.10 | 12.186 |
| S7 | 35.8908 | 0.2661 | | | |
| S8 FOURTH LENS | -4.6995 | 0.3869 | 1.656 | 21.50 | -195.244 |
| S9 | -5.0376 | 0.4356 | | | |
| S10 FIFTH LENS | 17.8224 | 0.7018 | 1.656 | 21.50 | -8.870 |
| S11 | 4.3169 | 0.1264 | | | |
| S12 SIXTH LENS | 1.6762 | 0.6174 | 1.536 | 55.70 | 842.045 |
| S13 | 1.4662 | 0.1939 | | | |
| S14 FILER | Infinity | 0.2100 | 1.518 | 64.20 | |
| S15 | Infinity | 0.6915 | | | |
| S16 IMAGING PLANE | Infinity | 0.0000 | | | |

FIG. 11

| THIRD EXAMPLE | S1 | S2 | S3 | S4 | S6 | S7 | S8 | S9 | S10 | S11 | S12 | S13 |
|---|---|---|---|---|---|---|---|---|---|---|---|---|
| Y RADIUS | 1.659 | 6.058 | 6.454 | 3.378 | 5.634 | 35.891 | -4.699 | -5.038 | 17.822 | 4.317 | 1.676 | 1.466 |
| CONIC CONSTANT (K) | -0.262 | -8.020 | -30.932 | 2.606 | -11.451 | 0.000 | 16.706 | -23.337 | 99.000 | -19.383 | -3.471 | -1.020 |
| 4th-ORDER COEFFICIENT (A) | 0.003 | -0.056 | -0.105 | -0.101 | -0.044 | -0.067 | 0.026 | 0.004 | 0.067 | -0.029 | -0.271 | -0.255 |
| 6th-ORDER COEFFICIENT (B) | 0.010 | 0.061 | 0.166 | 0.127 | -0.010 | -0.140 | -0.297 | -0.267 | -0.226 | -0.016 | 0.106 | 0.117 |
| 8th-ORDER COEFFICIENT (C) | -0.046 | -0.106 | -0.160 | 0.045 | -0.002 | 0.300 | 0.783 | 0.517 | 0.228 | 0.015 | -0.024 | -0.044 |
| 10th-ORDER COEFFICIENT (D) | 0.109 | 0.200 | 0.242 | -0.363 | -0.060 | -0.605 | -1.431 | -0.596 | -0.157 | -0.008 | 0.003 | 0.012 |
| 12th-ORDER COEFFICIENT (E) | -0.145 | -0.275 | -0.394 | 0.636 | 0.173 | 0.694 | 1.695 | 0.417 | 0.063 | 0.002 | 0.000 | -0.002 |
| 14th-ORDER COEFFICIENT (F) | 0.095 | 0.197 | 0.291 | -0.556 | -0.270 | -0.447 | -1.252 | -0.152 | -0.013 | 0.000 | 0.000 | 0.000 |
| 16th-ORDER COEFFICIENT (G) | -0.026 | -0.057 | -0.095 | 0.210 | 0.158 | 0.131 | 0.539 | 0.022 | 0.001 | 0.000 | 0.000 | 0.000 |
| 18th-ORDER COEFFICIENT (H) | 0.000 | 0.000 | 0.000 | 0.000 | 0.000 | 0.000 | -0.102 | 0.000 | 0.000 | 0.000 | 0.000 | 0.000 |
| 20th-ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 12

| FOURTH EXAMPLE | | | | | |
|---|---|---|---|---|---|
| F No. = 2.10 | f = | 4.475 | OAL = | 5.200 | |
| NUMBER OF SURFACE | RADIUS OF CURVATURE | THICKNESS / DISTANCE | REFRACTIVE INDEX | ABBE NUMBER | FOCAL LENGTH |
| S0 | Infinity | | | | |
| S1 FIRST LENS | 1.6761 | 0.6124 | 1.546 | 56.10 | 3.974 |
| S2 | 6.4169 | 0.1592 | | | |
| S3 SECOND LENS | 6.5477 | 0.2400 | 1.667 | 20.40 | -10.673 |
| S4 | 3.3605 | 0.1815 | | | |
| S5 STOP | Infinity | 0.0000 | | | |
| S6 THIRD LENS | 5.7873 | 0.3812 | 1.546 | 56.10 | 11.936 |
| S7 | 50.5343 | 0.2617 | | | |
| S8 FOURTH LENS | -4.7076 | 0.3829 | 1.656 | 21.50 | -359.584 |
| S9 | -4.9582 | 0.4401 | | | |
| S10 FIFTH LENS | 17.7092 | 0.6899 | 1.656 | 21.50 | -8.653 |
| S11 | 4.2311 | 0.1304 | | | |
| S12 SIXTH LENS | 1.6971 | 0.6339 | 1.536 | 55.70 | 7518.058 |
| S13 | 1.4765 | 0.1992 | | | |
| S14 FILER | Infinity | 0.2100 | 1.518 | 64.20 | |
| S15 | Infinity | 0.6777 | | | |
| S16 IMAGING PLANE | Infinity | 0.0000 | | | |

FIG. 15

| FOURTH EXAMPLE | S1 | S2 | S3 | S4 | S6 | S7 | S8 | S9 | S10 | S11 | S12 | S13 |
|---|---|---|---|---|---|---|---|---|---|---|---|---|
| Y RADIUS | 1.676 | 8.417 | 6.548 | 3.361 | 5.787 | 50.534 | -4.708 | -4.958 | 17.709 | 4.231 | 1.697 | 1.477 |
| CONIC CONSTANT(K) | -0.278 | -3.413 | -30.579 | 2.403 | -12.323 | 0.000 | 10.737 | -23.979 | 99.000 | -19.550 | -3.635 | -1.013 |
| 4th-ORDER COEFFICIENT(A) | 0.004 | -0.055 | -0.102 | -0.102 | -0.046 | -0.006 | 0.031 | 0.009 | 0.072 | -0.024 | -0.268 | -0.254 |
| 6th-ORDER COEFFICIENT(B) | 0.000 | 0.058 | 0.159 | 0.197 | 0.019 | -0.138 | -0.315 | -0.287 | -0.236 | -0.024 | 0.107 | 0.117 |
| 8th-ORDER COEFFICIENT(C) | -0.015 | -0.117 | -0.180 | 0.026 | -0.159 | 0.291 | 0.842 | 0.660 | 0.237 | 0.021 | -0.023 | -0.044 |
| 10th-ORDER COEFFICIENT(D) | 0.053 | 0.236 | 0.234 | -0.283 | 0.372 | -0.583 | -1.352 | -0.851 | -0.160 | -0.010 | 0.003 | 0.012 |
| 12th-ORDER COEFFICIENT(E) | -0.087 | -0.321 | -0.352 | 0.486 | -0.490 | 0.655 | 1.359 | 0.458 | 0.053 | 0.003 | 0.000 | -0.002 |
| 14th-ORDER COEFFICIENT(F) | 0.064 | 0.225 | 0.293 | -0.421 | 0.217 | -0.406 | -1.363 | -0.168 | -0.013 | 0.000 | 0.000 | 0.000 |
| 16th-ORDER COEFFICIENT(G) | -0.019 | -0.064 | -0.096 | 0.162 | 0.003 | 0.115 | 0.613 | 0.024 | 0.001 | 0.000 | 0.000 | 0.000 |
| 18th-ORDER COEFFICIENT(H) | 0.000 | 0.000 | 0.000 | 0.000 | 0.000 | 0.000 | -0.121 | 0.000 | 0.000 | 0.000 | 0.000 | 0.000 |
| 20th-ORDER COEFFICIENT(J) | 0.000 | 0.000 | 0.000 | 0.000 | 0.000 | 0.000 | 0.000 | 0.000 | 0.000 | 0.000 | 0.000 | 0.000 |

FIG. 16

| FIFTH EXAMPLE ||||||
|---|---|---|---|---|---|
| F No. = 2.10 | f = 4.475 | | OAL = 5.200 | | |
| NUMBER OF SURFACE | RADIUS OF CURVATURE | THICKNESS / DISTANCE | REFRACTIVE INDEX | ABBE NUMBER | FOCAL LENGTH |
| S0 | Infinity | | | | |
| S1 FIRST LENS | 1.6682 | 0.6080 | 1.546 | 56.10 | 3.952 |
| S2 | 6.4102 | 0.1574 | | | |
| S3 SECOND LENS | 6.5076 | 0.2400 | 1.667 | 20.40 | -10.756 |
| S4 | 3.3618 | 0.1837 | | | |
| S5 STOP | Infinity | 0.0000 | | | |
| S6 THIRD LENS | 5.6961 | 0.3892 | 1.546 | 56.10 | 12.030 |
| S7 | 41.8919 | 0.2547 | | | |
| S8 FOURTH LENS | -4.6748 | 0.4026 | 1.656 | 21.50 | -262.444 |
| S9 | -4.9692 | 0.4302 | | | |
| S10 FIFTH LENS | 17.6764 | 0.6786 | 1.656 | 21.50 | -8.510 |
| S11 | 4.1767 | 0.1391 | | | |
| S12 SIXTH LENS | 1.7035 | 0.6420 | 1.536 | 55.70 | 8262.463 |
| S13 | 1.4801 | 0.1946 | | | |
| S14 FILER | Infinity | 0.2100 | 1.518 | 64.20 | |
| S15 | Infinity | 0.6700 | | | |
| S16 IMAGING PLANE | Infinity | 0.0000 | | | |

FIG. 19

| FIFTH EXAMPLE | S1 | S2 | S3 | S4 | S6 | S7 | S8 | S9 | S10 | S11 | S12 | S13 |
|---|---|---|---|---|---|---|---|---|---|---|---|---|
| Y RADIUS | 1.668 | 6.410 | 6.508 | 3.362 | 5.696 | 41.802 | -4.675 | -4.969 | 17.676 | 4.177 | 1.704 | 1.480 |
| CONIC CONSTANT (K) | -0.288 | -3.417 | -50.575 | 2.427 | -12.353 | 0.000 | 16.830 | -23.733 | 99.066 | -19.988 | -3.862 | -1.015 |
| 4th-ORDER COEFFICIENT (A) | 0.004 | -0.056 | -0.104 | -0.108 | -0.050 | -0.013 | 0.032 | 0.014 | 0.078 | -0.023 | -0.234 | -0.253 |
| 6th-ORDER COEFFICIENT (B) | 0.104 | 0.066 | 0.166 | 0.152 | 0.003 | -0.113 | -0.311 | -0.284 | -0.243 | -0.026 | 0.104 | 0.116 |
| 8th-ORDER COEFFICIENT (C) | -0.029 | -0.135 | -0.146 | -0.053 | -0.049 | 0.165 | 0.821 | 0.535 | 0.243 | 0.021 | -0.053 | -0.043 |
| 10th-ORDER COEFFICIENT (D) | 0.076 | 0.262 | 0.192 | -0.086 | 0.104 | -0.245 | -1.542 | -0.606 | -0.164 | -0.010 | 0.003 | 0.011 |
| 12th-ORDER COEFFICIENT (E) | -0.115 | -0.346 | -0.279 | 0.180 | -0.130 | 0.178 | 1.931 | 0.420 | 0.064 | 0.003 | 0.000 | -0.002 |
| 14th-ORDER COEFFICIENT (F) | 0.080 | 0.239 | 0.239 | -0.155 | 0.033 | -0.058 | -1.538 | -0.152 | -0.013 | 0.000 | 0.000 | 0.000 |
| 16th-ORDER COEFFICIENT (G) | -0.023 | -0.067 | -0.081 | 0.068 | 0.040 | 0.009 | 0.728 | 0.022 | 0.001 | 0.000 | 0.000 | 0.000 |
| 18th-ORDER COEFFICIENT (H) | 0.000 | 0.000 | 0.000 | 0.000 | 0.000 | 0.000 | -0.155 | 0.000 | 0.000 | 0.000 | 0.000 | 0.000 |
| 20th-ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 20

OPTICAL IMAGING SYSTEM

CROSS-REFERENCE TO RELATED APPLICATIONS

This application is a Continuation Application of U.S. patent application Ser. No. 16/574,268 filed on Sep. 18, 2019, now U.S. Pat. No. 11,391,918 issued on Jul. 19, 2022, which is a Continuation Application of U.S. patent application Ser. No. 15/431,013 filed on Feb. 13, 2017, now U.S. Pat. No. 10,845,574 issued on Nov. 24, 2020, which claims the benefit under 35 U.S.C. § 119 (a) of Korean Patent Application No. 10-2016-0101229 filed on Aug. 9, 2016, in the Korean Intellectual Property Office, the entire disclosures of which are incorporated herein by reference for all purposes.

BACKGROUND

1. Field

The following description relates to an optical imaging system including six lenses.

2. Description of Related Art

A small camera module can be mounted on a portable terminal. For example, a small camera module may be mounted on a device having a thin width, such as a mobile phone. A small camera module may include an optical imaging system that is likewise improved by a reduced width, which includes a small number of lenses. For example, a small camera module may have an optical imaging system including four or less lenses.

However, there may be limitations for an optical imaging system having a small number of lenses used to implement a high-resolution camera module. Therefore, the development of an optical imaging system capable of simultaneously implementing high resolution with a thin-width camera module is sought.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having a positive refractive power and a concave an image-side surface. The optical imaging system includes a second lens and has a third lens with a concave image-side surface. The optical imaging system also includes a fourth lens and includes a fifth lens having a concave image-side surface. The optical imaging system further includes a sixth lens having a positive refractive power and having an inflection point formed on an image-side surface, while an F number of the system is lower than 2.2.

An object-side surface of the second lens may be convex in the optical imaging system. An object-side surface of the third lens can be convex in the optical imaging system. An image-side surface of the fourth lens may be convex. An object-side surface of the sixth lens may be convex whereas an image-side surface of the sixth lens can be concave in the optical imaging system.

The optical imaging system may satisfy the conditional expression $-3.0<f2/f<-1.5$, where f represents an overall focal length of the optical imaging system and f2 represents a focal length of the second lens. The optical imaging system can satisfy the conditional expressions $30<V1-V2<40$, $30<V1-V4<40$, and $30<V1-V5<40$, where V1 represents an Abbe number of the first lens, V2 represents an Abbe number of the second lens, V4 represents an Abbe number of the fourth lens, and V5 represents an Abbe number of the fifth lens. Further, the optical imaging system may satisfy the conditional expression $0.7<R6/f$, where f represents an overall focal length of the optical imaging system, and R6 represents a radius of curvature of an object-side surface of the third lens.

In another general aspect, an optical imaging system includes a first lens having a positive refractive power, a second lens having a negative refractive power, a third lens having a positive refractive power, a fourth lens having a negative refractive power, a fifth lens having a negative refractive power, and a sixth lens having a positive refractive power and having an inflection point formed on an image-side surface. The optical imaging system satisfies the conditional expression $OAL/f1<1.40$, where OAL represents a distance from the object-side surface of the first lens to an imaging plane, and f1 represents a focal length of the first lens.

An image-side surface of the first lens can be concave in the optical imaging system. An image-side surface of the third lens may be concave. An image-side surface of the fourth lens may be convex. An image-side surface of the fifth lens can be concave. An image-side surface of the sixth lens can be concave in the optical imaging system.

In another general aspect, an optical imaging system includes a first lens having a convex object-side surface along an optical axis, a second lens having a negative refractive power and a concave image-side surface along the optical axis, and a third lens having a positive refractive power. The optical imaging system further includes a fourth lens having a concave object-side surface along the optical axis, a fifth lens having a negative refractive power, and a sixth lens having a convex image-side surface along the optical axis.

The optical imaging system can satisfy the conditional expression $0.5<f1/f<1.2$, where f represents an overall focal length of the optical imaging system and f1 is represents a focal length of the first lens. The optical imaging system may satisfy the conditional expression $-0.7<f1/f2<0.1$, where f1 represents a focal length of the first lens and f2 represents a focal length of the second lens. The optical imaging system can also satisfy the conditional expression $-3.0<f2/f3<-0.5$, where f2 represents a focal length of the second lens and f3 represents a focal length of the third lens.

Other features and aspects will be apparent from the following detailed description, the drawings, and the claims.

BRIEF DESCRIPTION OF THE DRAWINGS

FIG. 3 is a table listing characteristics of lenses of the optical imaging system illustrated in FIG. 1.

FIG. 4 is a table listing aspherical characteristics of the optical imaging system illustrated in FIG. 1.

FIG. 7 is a table listing characteristics of lenses of the optical imaging system illustrated in FIG. 5.

FIG. 8 is a table listing aspherical characteristics of the optical imaging system illustrated in FIG. 5.

FIG. 11 is a table listing characteristics of lenses of the optical imaging system illustrated in FIG. 9.

FIG. 12 is a table listing aspherical characteristics of the optical imaging system illustrated in FIG. 9.

FIG. 15 is a table listing characteristics of lenses of the optical imaging system illustrated in FIG. 13.

FIG. 16 is a table listing aspherical characteristics of the optical imaging system illustrated in FIG. 13.

FIG. 19 is a table listing characteristics of lenses of the optical imaging system illustrated in FIG. 17.

FIG. 20 is a table listing aspherical characteristics of the optical imaging system illustrated in FIG. 17.

Figure 1:
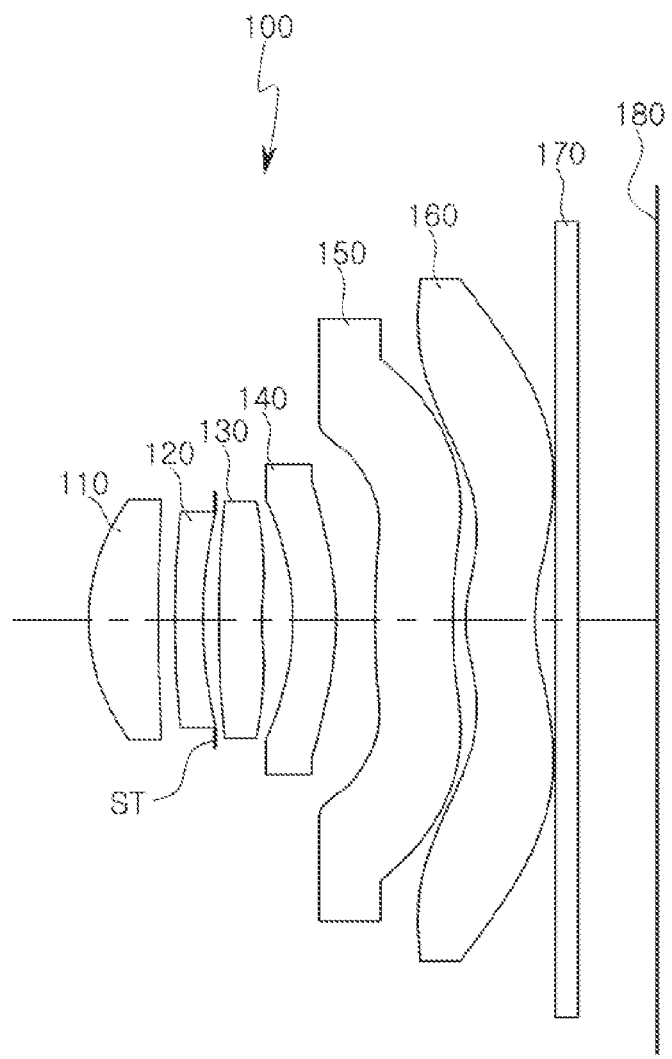
FIG. 1 is a view of an optical imaging system, according to a first example.

Throughout the drawings and the detailed description, the same reference numerals refer to the same elements where applicable. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Examples provide an optical imaging system having high resolution. Subsequently, examples are described in further detail with reference to the accompanying drawings.

In accordance with an example, a first lens refers to a lens closest to an object or a subject from which an image is captured. A sixth lens is a lens closest to an imaging plane or an image sensor. In an embodiment, all radii of curvature of lenses, thicknesses, distances from an object-side surface of a first lens to an imaging plane (OAL), half diagonal lengths of the imaging plane (IMG HT), and focal lengths of each lens are indicated in millimeters (mm). A person skilled in the relevant art will appreciate that other units of measurement may be used. Further, in embodiments, all distances on the optical axis between the stop and the image sensor (SLs), image heights (IMGHs), back focus lengths (BFLs) of the lenses, an overall focal length of an optical system, and a focal length of each lens are indicated in millimeters (mm). Further, thicknesses of lenses, gaps between the lenses, OALs, TLs, SLs are distances measured based on an optical axis of the lenses.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include six lenses with a refractive power. However, the number of lenses in the optical system may vary, for example, between two to six lenses, while achieving the various results and benefits described below. Also, although each lens is described with a particular refractive power, a different refractive power for at least one of the lenses may be used to achieve the intended result.

An optical imaging system includes six lenses sequentially disposed from an object side toward an imaging plane. Hereinafter, each lens will be described in detail.

In an example, the first lens has a positive refractive power. One surface of the first lens is convex. For example, an object-side surface of the first lens may be convex. The first lens has an aspherical surface. For example, both surfaces of the first lens are aspherical.

The first lens is formed of a material having a high degree of light transmissivity and excellent workability. For example, the first lens is formed of a plastic material. However, a material of the first lens is not limited to being a plastic material. In another example, the first lens may be formed of a glass material.

A second lens has refractive power. As an example, the second lens has a negative refractive power. One surface of the second lens is convex. In an embodiment, an object-side surface of the second lens may be convex. The second lens has an aspherical surface. For example, both surfaces of the second lens are aspherical.

The second lens is formed of a material having a high degree of light transmissivity and excellent workability. For example, the second lens is formed of a plastic material. However, a material of the second lens is not limited to being plastic. In another example, the second lens may be formed of a glass material. The second lens has an Abbe number lower than that of the first lens. In an embodiment, the second lens has the Abbe number of 22 or less.

A third lens has refractive power. In an embodiment, the third lens has a positive refractive power. One surface of the third lens is convex. For example, an object-side surface of the third lens is convex. The third lens has an aspherical surface. In an embodiment, both surfaces of the third lens may be aspherical.

The third lens is formed of a material having a high degree of light transmissivity and excellent workability. For example, the third lens is formed of a plastic material. However, a material of the third lens is not limited to being plastic. In another example, the third lens may be formed of a glass material.

A fourth lens has refractive power. As an example, the fourth lens may have positive refractive power or negative refractive power. One surface of the fourth lens is convex. For example, an image-side surface of the fourth lens is convex. The fourth lens has an aspherical surface. For example, both surfaces of the fourth lens are aspherical.

The fourth lens is formed of a material having a high degree of light transmissivity and excellent workability. For example, the fourth lens is formed of a plastic material. However, a material of the fourth lens is not limited to being plastic. In another example, the fourth lens may be formed of a glass material. The fourth lens is formed of a material substantially the same as that of the second lens. In an embodiment, a refractive index and an Abbe number of the fourth lens can be the same as those of the second lens.

A fifth lens has refractive power. In an embodiment, the fifth lens has a negative refractive power. One surface of the fifth lens is concave. For example, an image-side surface of the fifth lens is concave. The fifth lens has an aspherical surface. For example, both surfaces of the fifth lens may be aspherical. The fifth lens has an inflection point. As an example, an object-side surface and an image-side surface of the fifth lens each have one or more inflection points.

The fifth lens is formed of a material having a high degree of light transmissivity and excellent workability. For example, the fifth lens is formed of a plastic material. However, a material of the fifth lens is not limited to being plastic. In another example, the fifth lens may be formed of a glass material. The fifth lens is formed of a material the same as that of the second lens. In an embodiment, a refractive index and an Abbe number of the fifth lens are the same as those of the second lens.

A sixth lens has refractive power. As an example, the sixth lens has a positive refractive power. One surface of the sixth lens is concave. For example, an image-side surface of the sixth lens is concave. The sixth lens has an inflection point. In an embodiment, both surfaces of the sixth lens may each have one or more inflection points formed thereon.

The sixth lens has an aspherical surface. For example, both surfaces of the sixth lens are aspherical. The sixth lens is formed of a material having a high degree of light transmissivity and excellent workability. For example, the sixth lens is formed of a plastic material. However, a material of the sixth lens is not limited to being plastic. In another example, the sixth lens may be formed of a glass material.

Each of the first lens to the sixth lens, as described in the examples above, has an aspherical surface. For example, at least one surface of each of the first lens to the sixth lens may be an aspherical surface. Here, an aspherical surface of each lens may be represented by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad \text{[Equation 1]}$$

In Equation 1, c represents an inverse of a radius of curvature of the lens, k represents a conic constant, r represents a distance from a certain point on an aspherical surface of the lens to an optical axis, A to J represent aspherical constants, and Z (or SAG) represents a distance between the certain point on the aspherical surface of the lens at the distance r and a tangential plane meeting the apex of the aspherical surface of the lens.

The optical imaging system may include a stop in an embodiment. The stop can be disposed between the second lens and the third lens in some examples. The optical imaging system may include a filter in embodiments. The filter blocks some wavelengths of incident light, incident through the first lens to the sixth lens. For example, the filter blocks an infrared wavelength of incident light. The filter is manufactured to be thin. To this end, the filter may be formed of a plastic material.

The optical imaging system may include an image sensor. The image sensor provides an imaging plane on which an image is formed by light refracted through lenses. The image sensor may be configured to implement a high degree of resolution. In an example, a unit size of a pixel forming the image sensor is 1.12 µm or less.

The optical imaging system satisfies one or any combination of the following Conditional Expressions:
[Conditional Expression 1] $0.5<f1/f<1.2$
[Conditional Expression 2] $-3.0<f2/f<-1.5$
[Conditional Expression 3] $1.5<f3/f<3.0$
[Conditional Expression 4] $f4/f<0$

[Conditional Expression 5] f5/f<0
[Conditional Expression 6] 0<f6/f
[Conditional Expression 7] 30<V1-V2<40
[Conditional Expression 8] 30<V1-V4<40
[Conditional Expression 9] 30<V1-V5<40
[Conditional Expression 10] OAL/f<1.25
[Conditional Expression 11] OAL/f1<1.4
[Conditional Expression 12] −0.7<f1/f2<−0.1
[Conditional Expression 13] −3.0<f2/f3<−0.5
[Conditional Expression 14] 0.15<BFL/f
[Conditional Expression 15] D12/f<0.08
[Conditional Expression 16] 0.3<R1/f
[Conditional Expression 17] 0.7<R6/f
[Conditional Expression 18] R9/f <−2.0
[Conditional Expression 19] 80<FOV
[Conditional Expression 20] F No.<2.2

In the Conditional Expressions, f represents an overall focal length of the optical imaging system, f1 represents a focal length of the first lens, f2 represents a focal length of the second lens, f3 represents a focal length of the third lens, f4 represents a focal length of the fourth lens, f5 represents a focal length of the fifth lens, and f6 represents a focal length of the sixth lens. In Conditional Expressions 7-9, V1 represents an Abbe number of the first lens, V2 represents an Abbe number of the second lens, V4 represents an Abbe number of the fourth lens, and V5 represents an Abbe number of the fifth lens. In Conditional Expressions 10, 11, 14 and 15, OAL represents a distance from the object-side surface of the first lens to an imaging plane, BFL represents a distance from the image-side surface of the sixth lens to an imaging plane, and D12 represents a distance from the image-side surface of the first lens to the object-side surface of the second lens. In Conditional Expressions 16-19, R1 represents a radius of curvature of the object-side surface of the first lens, R6 represents a radius of curvature of the object-side surface of the third lens, R9 represents a radius of curvature of the image-side surface of the fourth lens, and FOV represents an angle of view of the optical imaging system.

Conditional Expression 1 is an equation to provide parameters of the first lens for optical imaging systems. For example, systems falling outside of the numerical range of Conditional Expression 1 have significantly high or low refractive power, and in turn overall optical performance of the optical imaging system is decreased.

Conditional Expression 2 is an equation to provide parameters of the second lens for optical imaging systems. For example, systems falling outside of the numerical range of Conditional Expression 2 have significantly high or low refractive power, and thus it is difficult to perform aberration correction of the optical imaging system.

Conditional Expression 3 is an equation to provide parameters of the third lens for optical imaging systems. For example, systems falling outside of the numerical range of Conditional Expression 3 have significantly high or low refractive power, and it is then difficult to perform aberration correction of the optical imaging system.

Conditional Expressions 4 through 6 are equations to provide parameters of refractive power for the fourth lens to the sixth lens of optical imaging systems. For example, the fourth lens to the sixth lens may have a positive refractive power or a negative refractive power in ranges satisfying Conditional Expressions 4 through 6. Conditional Expressions 7 through 9 are equations to reduce chromatic aberration. Conditional Expressions 10 and 11 are equations to reduce the size of optical imaging systems.

Conditional Expression 12 is an equation for reducing aberration by providing a refractive power ratio between the first lens and the second lens. For example, in cases where the first lens and the second lens are outside of the numerical range of Conditional Expression 12, one of the first lens and the second lens has a significantly high refractive power relative to the other. Thus, by decreasing the aberration characteristics of the optical imaging system, overall optical performance is increased.

Conditional Expression 13 is an equation to reduce image aberration using a refractive power ratio between the second lens and the third lens. For example, in a case in which the second lens and the third lens are outside of the numerical range of Conditional Expression 13, one of the second lens and the third lens may have significantly high refractive power. Thus, aberration correction characteristics of the optical imaging system may be decreased and optical performance may be decreased.

Conditional Expression 14 is an equation to provide design conditions for miniaturization of the optical imaging system. For example, in a case in which the optical imaging system is outside of an upper limit value of Conditional Expression 14, it may be difficult to miniaturize the optical imaging system.

Conditional Expression 15 is an equation to provide design conditions for improving longitudinal chromatic aberration. For example, in a case in which the optical imaging system is outside of the numerical range of Conditional Expression 15, it may be difficult to improve the longitudinal chromatic aberration of an image.

Conditional Expressions 16 through 18 are equations to provide design conditions for limiting magnitudes of refractive power of the first lens, the third lens, and the fourth lens, respectively. For example, performance of the optical imaging system may be decreased in cases in which the first lens, the third lens, or the fourth lens are outside of the numerical ranges of Conditional Expression 16 to 18.

Next, optical imaging systems, according to several examples, will be described. An optical imaging system, according to a first example, will be described with reference to FIG. 1. An optical imaging system 100, according to the first example, includes a plurality of lenses each described by a respective refractive power. For example, the optical imaging system 100 includes a first lens 110, a second lens 120, a third lens 130, a fourth lens 140, a fifth lens 150, and a sixth lens 160.

The first lens 110 has a positive refractive power. An object-side surface of lens 110 is convex, and an image-side surface of lens 110 is concave. The second lens 120 has a negative refractive power. An object-side surface of lens 120 is convex, and an image-side surface of lens 120 is concave. The third lens 130 has a positive refractive power. An object-side surface of lens 130 is convex, and an image-side surface of lens 130 is concave.

The fourth lens 140 has a negative refractive power. An object-side surface of lens 140 is concave, and an image-side surface of lens 140 is convex. The fifth lens 150 has a negative refractive power. An object-side surface of lens 150 is convex, and an image-side surface of lens 150 is concave. In addition, the fifth lens 150 has an inflection point formed on an object-side surface or an image-side surface. For example, an object-side surface of the fifth lens 150 is convex in a paraxial region and is concave in a vicinity of a paraxial region. In a similar manner, an image-side surface of the fifth lens 150 is concave in a paraxial region and is convex in a vicinity of a paraxial region.

The sixth lens 160 has a positive refractive power. An object-side surface of lens 160 is convex, and an image-side surface of lens 160 is concave. In addition, the sixth lens 160 has an inflection point formed on both surfaces. For example, an object-side surface of the sixth lens 160 is convex in a paraxial region and is concave in a vicinity of a paraxial region. In a similar manner, an image-side surface of the sixth lens 160 is concave in a paraxial region and is convex in a vicinity of a paraxial region.

The optical imaging system 100 may include a stop ST. In the illustrated example, the stop ST is disposed between the second lens 120 and the third lens 130. The stop ST, disposed as described above, adjusts an amount of light incident on an imaging plane 180.

In an embodiment, the optical imaging system 100 includes a filter 170. For example, the filter 170 is disposed between the sixth lens 160 and the imaging plane 180. The filter 170, disposed as described above, blocks infrared light from being incident on the imaging plane 180.

The optical imaging system 100 may include an image sensor. In the illustrated embodiment, the image sensor provides the imaging plane 180 in which an image is formed by light refracted through lenses. In addition, the image sensor converts an optical signal collected in the imaging plane 180 into an electrical signal.

Figure 2:
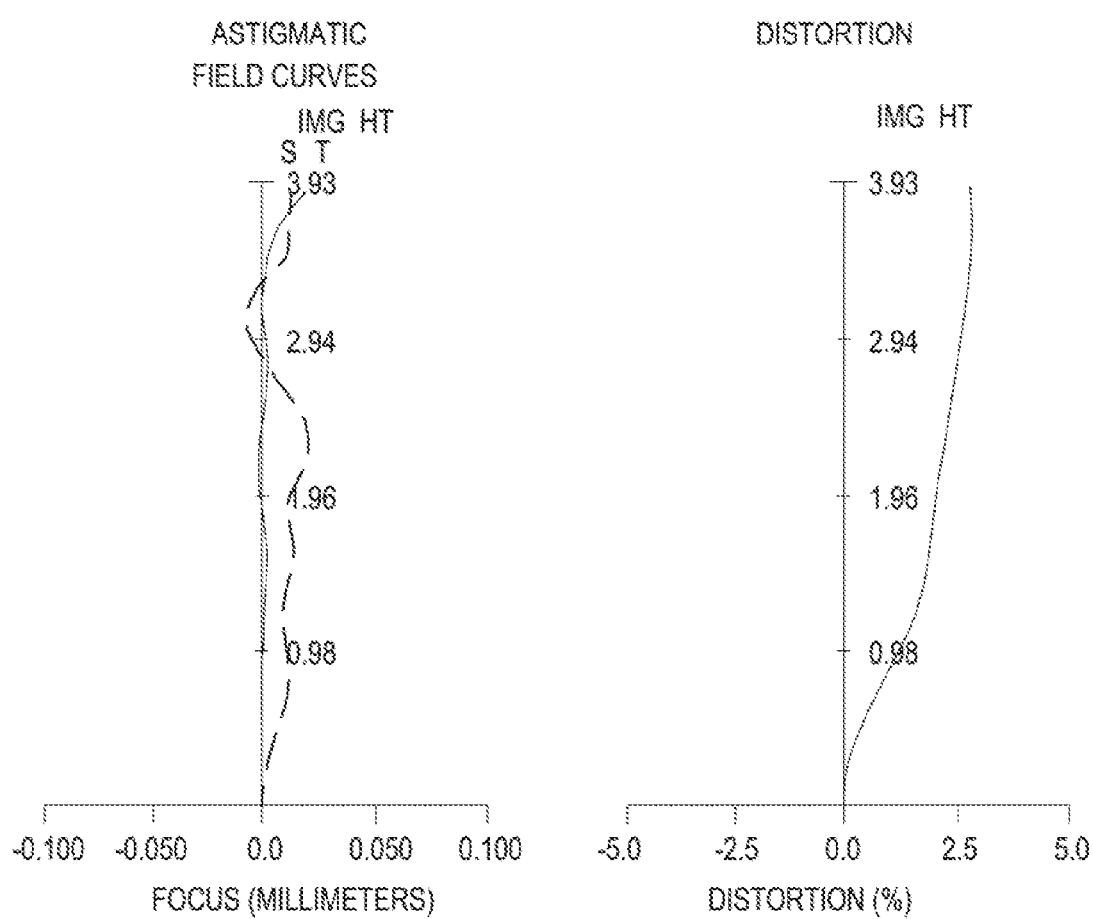
FIG. 2 contains graphs illustrating aberration curves of the optical imaging system illustrated in FIG. 1.

The optical imaging system 100, configured as described above, has a low F number. For example, the F number of the optical imaging system, according to the first example, is 2.10. The optical imaging system, according to the first example, exhibits aberration characteristics as illustrated by the graphs in FIG. 2. FIGS. 3 and 4 are tables listing characteristics of lenses and aspherical characteristics of the optical imaging system according to the first example.

Figure 5:
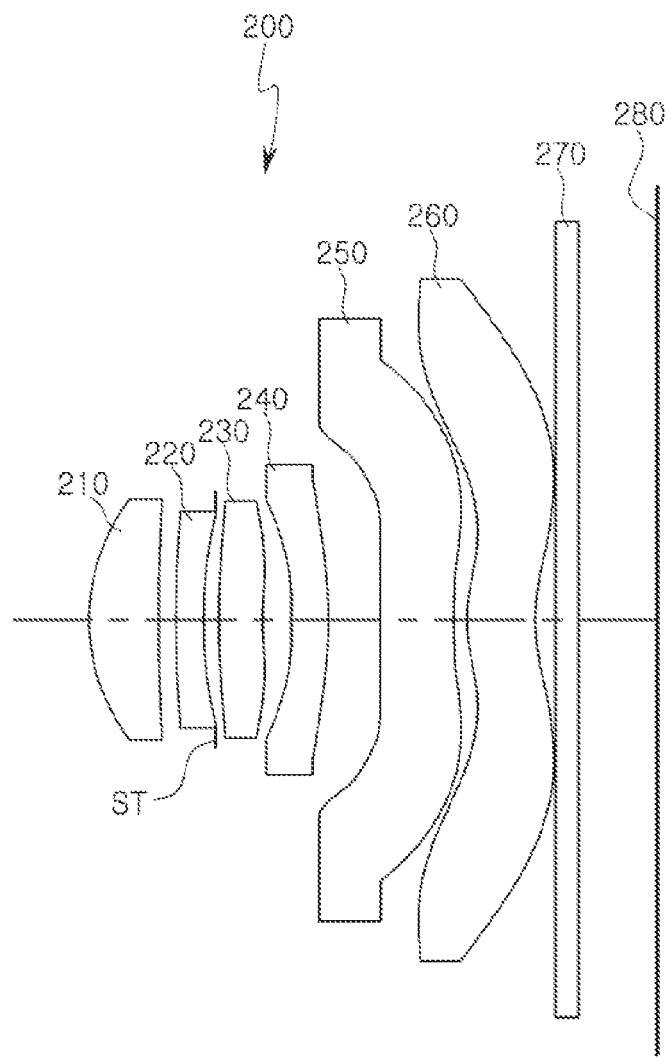
FIG. 5 is a view of an optical imaging system, according to a second example.

With reference to FIG. 5, an optical imaging system, according to a second example, will be described. An optical imaging system 200, according to the second example, includes a plurality of lenses each described by a respective refractive power. For example, the optical imaging system 200 includes a first lens 210, a second lens 220, a third lens 230, a fourth lens 240, a fifth lens 250, and a sixth lens 260.

The first lens 210 has a positive refractive power. An object-side surface of lens 210 is convex, and an image-side surface of lens 210 is concave. The second lens 220 has a negative refractive power. An object-side surface of lens 220 is convex, and an image-side surface of lens 220 is concave. The third lens 230 has a positive refractive power. An object-side surface of lens 230 is convex, and an image-side surface of lens 230 is concave.

The fourth lens 240 has a negative refractive power. An object-side surface of lens 240 is convex, and an image-side surface of lens 240 is convex. The fifth lens 250 has a negative refractive power. An object-side surface of lens 250 is concave, and an image-side surface of lens 250 is concave. In addition, the fifth lens 250 has an inflection point formed on an object-side surface or an image-side surface. For example, an object-side surface of the fifth lens 250 is convex in a paraxial region and is concave in a vicinity of a paraxial region. In a similar manner, an image-side surface of the fifth lens 250 is concave in a paraxial region and is convex in a vicinity of a paraxial region.

The sixth lens 260 has a positive refractive power. An object-side surface of sixth lens 260 is convex, and an image-side surface of lens 260 is concave. In addition, the sixth lens 260 has an inflection point formed on both surfaces. For example, an object-side surface of the sixth lens 260 is convex in a paraxial region and is concave in a vicinity of a paraxial region. In a similar manner, an image-side surface of the sixth lens 260 is concave in a paraxial region and is convex in a vicinity of a paraxial region.

The optical imaging system 200 may include a stop ST. In the illustrated example, the stop ST is disposed between the second lens 220 and the third lens 230. The stop ST, disposed as described above, adjusts an amount of light incident on an imaging plane 280.

In an embodiment, the optical imaging system 200 includes a filter 270. For example, the filter 270 is disposed between the sixth lens 260 and the imaging plane 280. The filter 270, disposed as described above, blocks infrared light from being incident on the imaging plane 280.

The optical imaging system 200 may include an image sensor. In the illustrated embodiment, the image sensor provides the imaging plane 280 in which an image is formed by light refracted through lenses. In addition, the image sensor converts an optical signal collected on the imaging plane 280 into an electrical signal.

Figure 6:
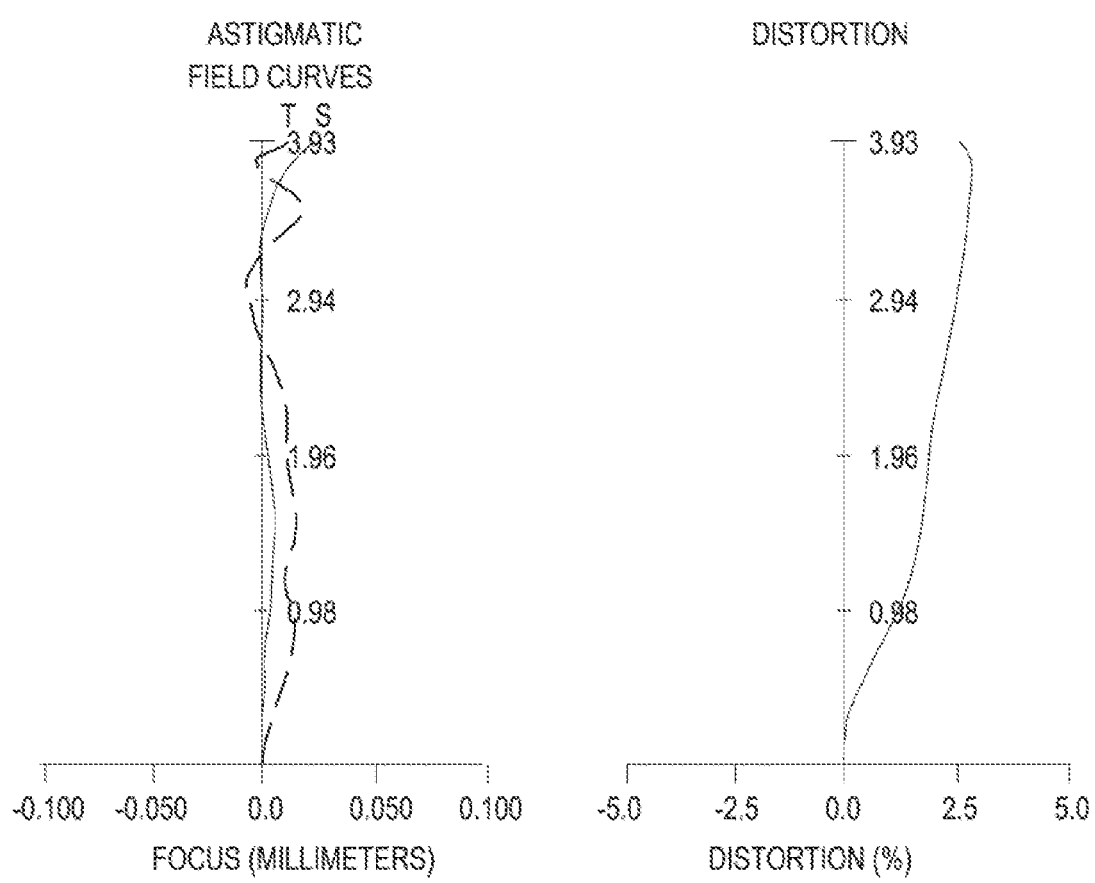
FIG. 6 contains graphs illustrating aberration curves of the optical imaging system illustrated in FIG. 5.

The optical imaging system 200, configured as described above, has a low F number. For example, the F number of the optical imaging system, according to the second example, is 2.10. The optical imaging system, according to the second example, exhibits aberration characteristics as illustrated by the graphs in FIG. 6. FIGS. 7 and 8 are tables listing characteristics of lenses and aspherical characteristics of an optical imaging system, according to the second example.

Figure 9:
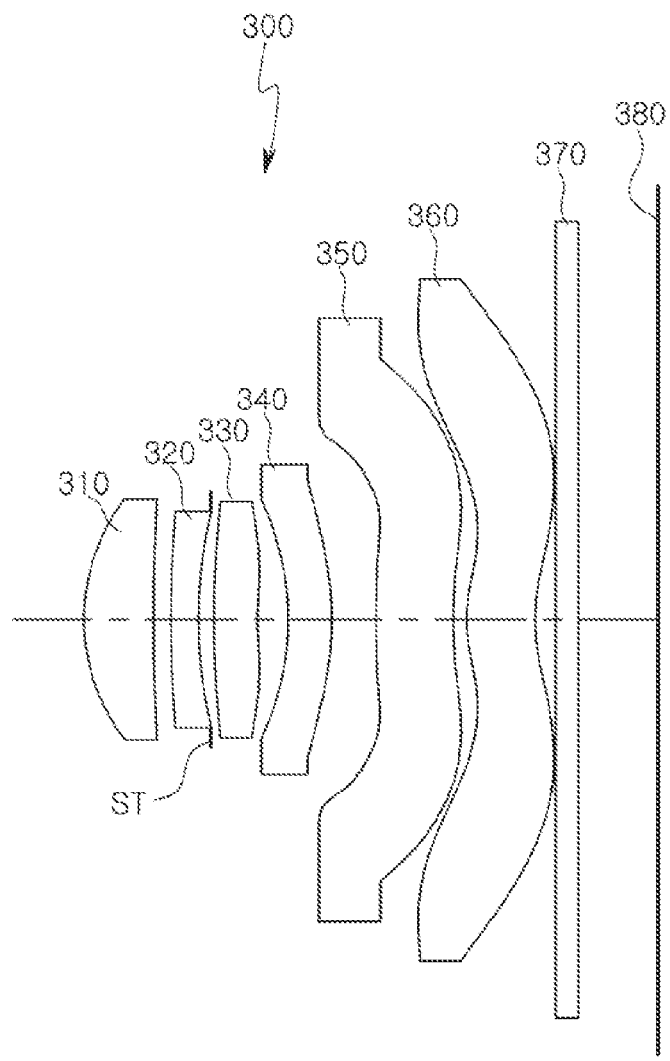
FIG. 9 is a view of an optical imaging system, according to a third example.

With reference to FIG. 9, an optical imaging system, according to a third example, will be described. An optical imaging system 300 may include a plurality of lenses each described by a respective refractive power. For example, the optical imaging system 300 includes a first lens 310, a second lens 320, a third lens 330, a fourth lens 340, a fifth lens 350, and a sixth lens 360.

The first lens 310 has a positive refractive power. An object-side surface of lens 310 is convex, and an image-side surface of lens 310 is concave. The second lens 320 has a negative refractive power. An object-side surface of lens 320 is convex, and an image-side surface of lens 320 is concave. The third lens 330 has a positive refractive power. An object-side surface of lens 330 is convex, and an image-side surface of lens 330 is concave.

The fourth lens 340 has a negative refractive power. An object-side surface of lens 340 is concave, and an image-side surface of lens 340 is convex. The fifth lens 350 has a negative refractive power. An object-side surface of lens 350 is convex, and an image-side surface of lens 350 is concave. In addition, the fifth lens 350 has an inflection point formed on an object-side surface or an image-side surface. For example, an object-side surface of the fifth lens 350 is convex in a paraxial region and is concave in a vicinity of a paraxial region. In a similar manner, an image-side surface of the fifth lens 350 is concave in a paraxial region and is convex in a vicinity of a paraxial region.

The sixth lens 360 has a positive refractive power. An object-side surface of lens 360 is convex, and an image-side surface of lens 360 is concave. In addition, the sixth lens 360 has an inflection point formed on both surfaces. For example, an object-side surface of the sixth lens 360 is convex in a paraxial region and is concave in a vicinity of a paraxial region. In a similar manner, an image-side surface of the sixth lens 360 is concave in a paraxial region and is convex in a vicinity of a paraxial region.

The optical imaging system 300 may include a stop ST. In the illustrated example, the stop ST is disposed between the second lens 320 and the third lens 330. The stop ST, disposed as described above, adjusts an amount of light incident on an imaging plane 380.

In an embodiment, the optical imaging system 300 includes a filter 370. For example, the filter 370 is disposed between the sixth lens 360 and the imaging plane 380. The filter 370, disposed as described above, blocks infrared light from being incident on the imaging plane 380.

The optical imaging system 300 may include an image sensor. In the illustrated embodiment, the image sensor provides the imaging plane 380 in which an image is formed by light refracted through lenses. In addition, the image sensor converts an optical signal collected in the imaging plane 380 into an electrical signal.

Figure 10:
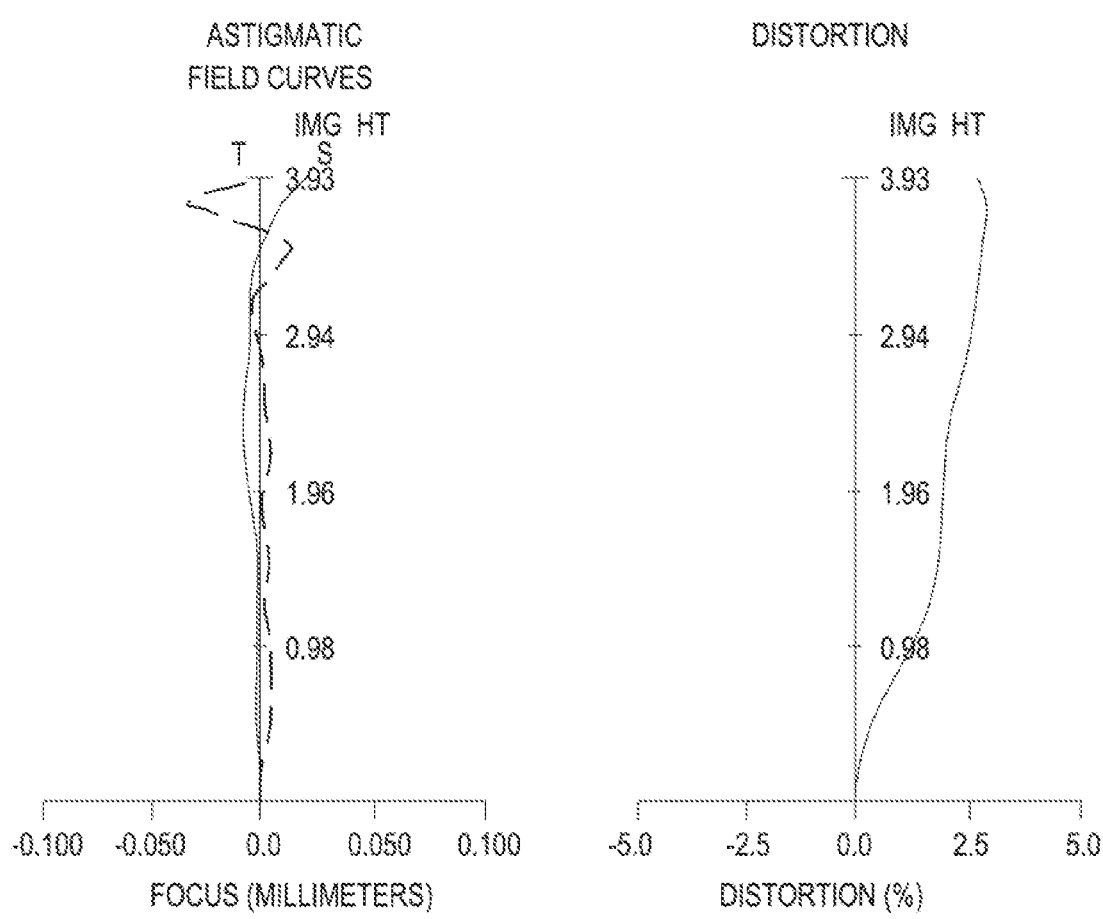
FIG. 10 contains graphs illustrating aberration curves of the optical imaging system illustrated in FIG. 9.

The optical imaging system 300, configured as described above, has a low F number. For example, the F number of the optical imaging system, according to the third example, is 2.10. The optical imaging system, according to the third example, exhibits aberration characteristics as illustrated by the graphs in FIG. 10. FIGS. 11 and 12 are tables listing characteristics of lenses and aspherical characteristics of the optical imaging system, according to the third example.

Figure 13:
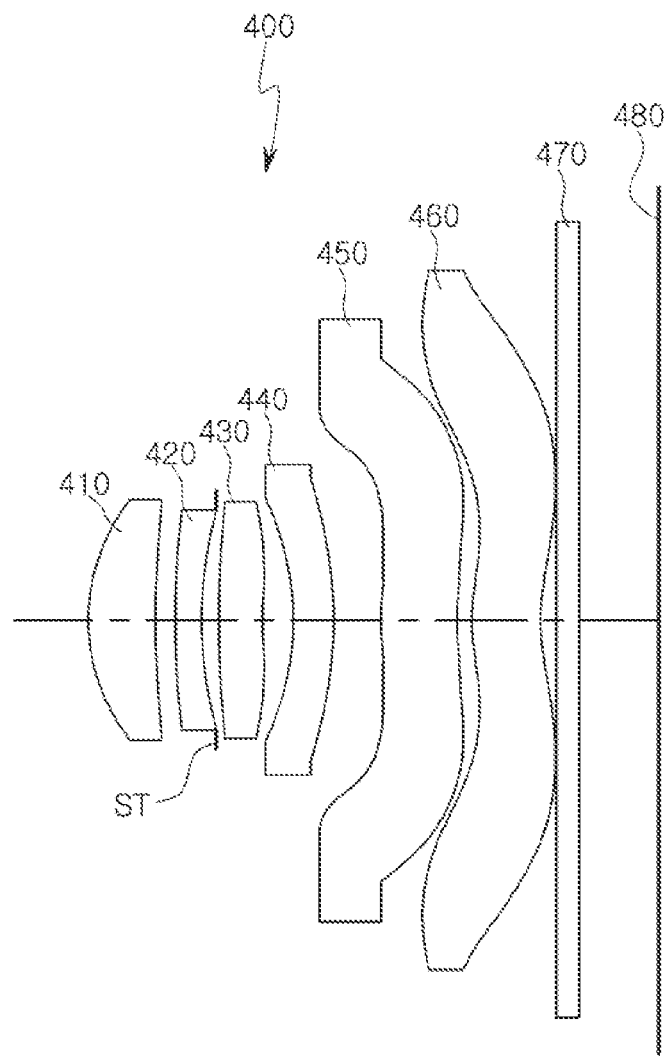
FIG. 13 is a view of an optical imaging system according to a fourth example.

With reference to FIG. 13, an optical imaging system, according to a fourth example, will be described. An optical imaging system 400 includes a plurality of lenses each described by a respective refractive power. For example, the optical imaging system 400 includes a first lens 410, a second lens 420, a third lens 430, a fourth lens 440, a fifth lens 450, and a sixth lens 460.

The first lens 410 has a positive refractive power. An object-side surface of lens 410 is convex, and an image-side surface of lens 410 is concave. The second lens 420 has a negative refractive power. An object-side surface of lens 420 is convex, and an image-side surface of lens 420 is concave. The third lens 430 has a positive refractive power. An object-side surface of lens 430 is convex, and an image-side surface of lens 430 is concave.

The fourth lens 440 has a negative refractive power. An object-side surface of lens 440 is concave, and an image-side surface of lens 440 is convex. The fifth lens 450 has a negative refractive power. An object-side surface of lens 450 is convex, and an image-side surface of lens 450 is concave. In addition, the fifth lens 450 has an inflection point formed on an object-side surface or an image-side surface. For example, an object-side surface of the fifth lens 450 is convex in a paraxial region and is concave in a vicinity of a paraxial region. In a similar manner, an image-side surface of the fifth lens 450 is concave in a paraxial region and is convex in a vicinity of a paraxial region.

The sixth lens 460 has a positive refractive power. An object-side surface of lens 460 is convex, and an image-side surface of lens 460 is concave. In addition, the sixth lens 460 has an inflection point formed on both surfaces. For example, an object-side surface of the sixth lens 460 is convex in a paraxial region and is concave in a vicinity of a paraxial region. In a similar manner, an image-side surface of the sixth lens 460 is concave in a paraxial region and is convex in a vicinity of a paraxial region.

The optical imaging system 400 may include a stop ST. In the illustrated example, the stop ST is disposed between the second lens 420 and the third lens 430. The stop ST, disposed as described above, adjusts an amount of light incident on an imaging plane 480.

In an embodiment, the optical imaging system 400 includes a filter 470. For example, the filter 470 is disposed between the sixth lens 460 and the imaging plane 480. The filter 470, disposed as described above, blocks infrared light from being incident on the imaging plane 480.

The optical imaging system 400 may include an image sensor. In the illustrated embodiment, the image sensor provides the imaging plane 480 in which an image is formed by light refracted through lenses. In addition, the image sensor converts an optical signal collected in the imaging plane 480 into an electrical signal.

Figure 14:
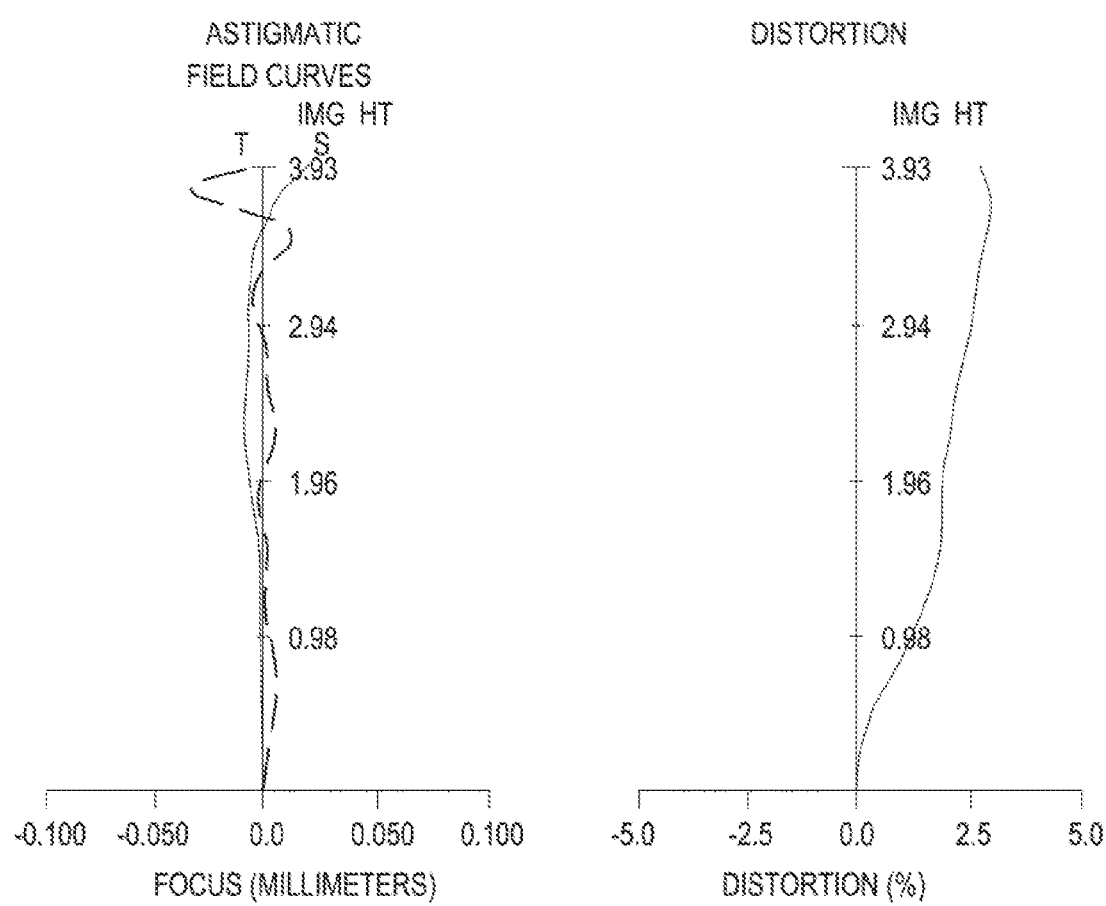
FIG. 14 contains graphs illustrating aberration curves of the optical imaging system illustrated in FIG. 13.

The optical imaging system 400, configured as described above, has a low F number. For example, the F number of the optical imaging system according to the fourth example is 2.10. The optical imaging system, according to the fourth example, exhibits aberration characteristics as illustrated by the graphs in FIG. 14. FIGS. 15 and 16 are tables listing characteristics of lenses and aspherical characteristics of the optical imaging system, according to the fourth example.

Figure 17:
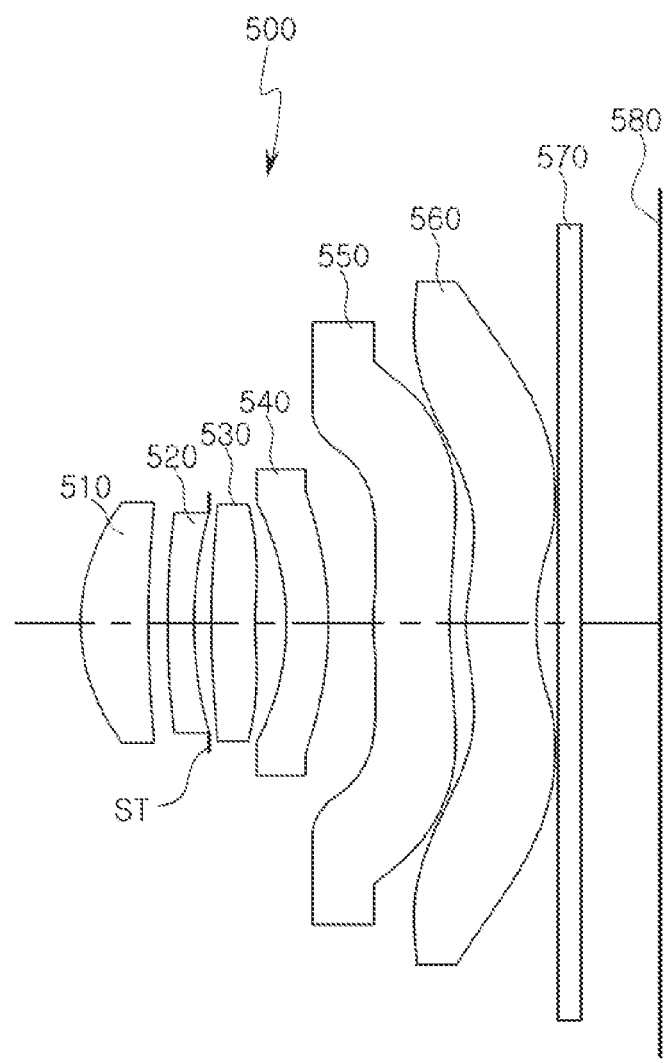
FIG. 17 is a view of an optical imaging system according to a fifth example.

With reference to FIG. 17, an optical imaging system, according to a fifth example, will be described. An optical imaging system 500 includes a plurality of lenses each described by a respective refractive power. For example, the optical imaging system 500 includes a first lens 510, a second lens 520, a third lens 530, a fourth lens 540, a fifth lens 550, and a sixth lens 560.

The first lens 510 has a positive refractive power. An object-side surface of lens 510 is convex, and an image-side surface of lens 510 is concave. The second lens 520 has a negative refractive power. An object-side surface of lens 520 is convex, and an image-side surface of lens 520 is concave. The third lens 530 has a positive refractive power. An object-side surface of lens 530 is convex, and an image-side surface of lens 530 is concave.

The fourth lens 540 has a negative refractive power. An object-side surface of lens 540 is concave, and an image-side surface of lens 540 is convex. The fifth lens 550 has a negative refractive power. An object-side surface of lens 550 is convex, and an image-side surface of lens 550 is concave. In addition, the fifth lens 550 has an inflection point formed on an object-side surface or an image-side surface. For example, an object-side surface of the fifth lens 550 is convex in a paraxial region and is concave in a vicinity of a paraxial region. In a similar manner, an image-side surface of the fifth lens 550 is concave in a paraxial region and is convex in a vicinity of a paraxial region.

The sixth lens 560 has a positive refractive power. An object-side surface of lens 560 is convex, and an image-side surface of lens 560 is concave. In addition, the sixth lens 560 has an inflection point formed on both surfaces. For example, an object-side surface of the sixth lens 560 is convex in a paraxial region and is concave in a vicinity of a paraxial region. In a similar manner, an image-side surface of the sixth lens 560 is concave in a paraxial region and is convex in a vicinity of a paraxial region.

The optical imaging system 500 may include a stop ST. In the illustrated example, the stop ST is disposed between the second lens 520 and the third lens 530. The stop ST, disposed as described above, adjusts an amount of light incident on an imaging plane 580.

In an embodiment, the optical imaging system 500 includes a filter 570. For example, the filter 570 is disposed between the sixth lens 560 and the imaging plane 580. The filter 570, disposed as described above, blocks infrared light from being incident on the imaging plane 580.

The optical imaging system 500 may include an image sensor. In the illustrated embodiment, the image sensor provides the imaging plane 580 in which an image is formed by light refracted through lenses. In addition, the image sensor converts an optical signal collected in the imaging plane 580 into an electrical signal.

Figure 18:
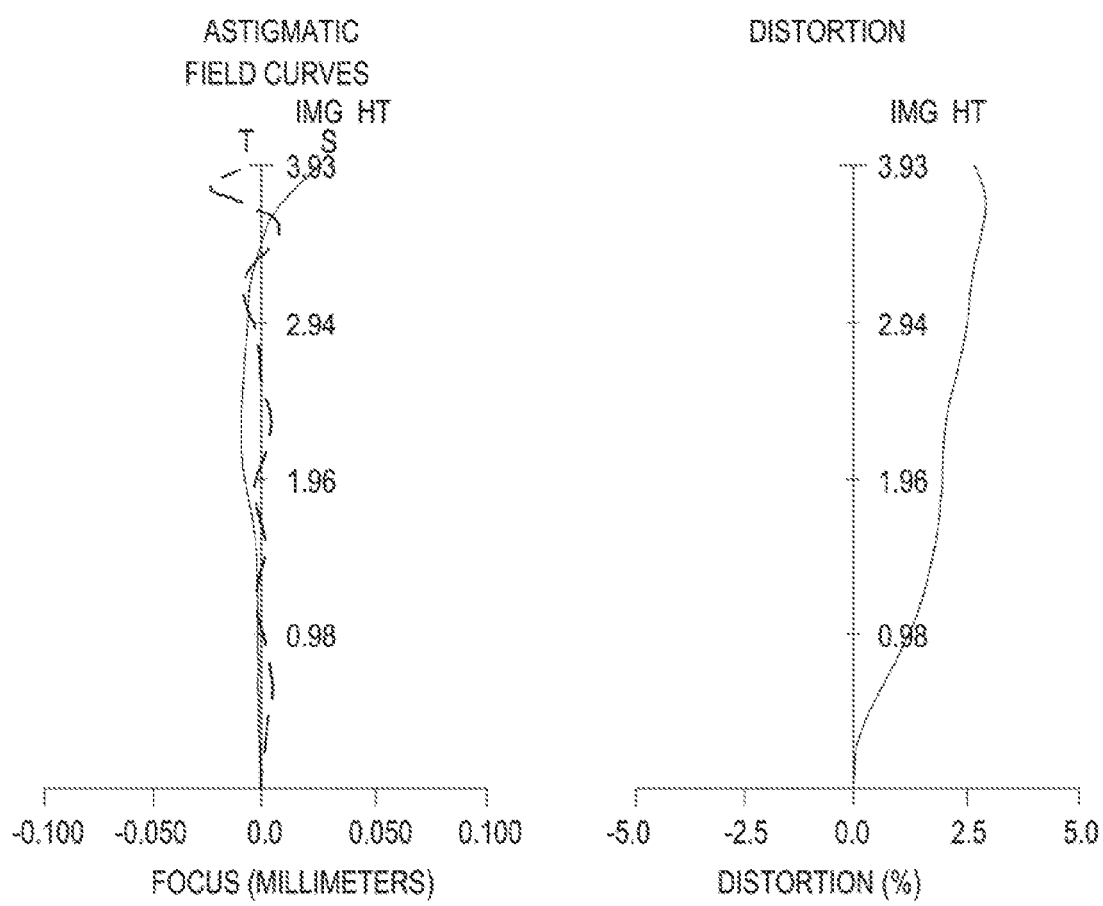
FIG. 18 contains graphs illustrating aberration curves of the optical imaging system illustrated in FIG. 17.

The optical imaging system 500, configured as described above, has a low F number. For example, the F number of the optical imaging system according to the fifth example may be 2.10. The optical imaging system, according to the fifth example, exhibits aberration characteristics as illustrated by the graphs in FIG. 18. FIGS. 19 and 20 are tables listing characteristics of lenses and aspherical characteristics of the optical imaging system, according to the fifth example.

Table 1 represents values of Conditional Expressions of the optical imaging systems implemented as described in the first example to the fifth example. As shown in Table 1, the optical imaging systems, according to the first example to the fifth example, satisfy all numerical ranges according to Conditional Expressions described herein.

TABLE 1

| Conditional Expression | First Example | Second Example | Third Example | Fourth Example | Fifth Example |
|---|---|---|---|---|---|
| f1/f | 0.955 | 0.912 | 0.891 | 0.888 | 0.883 |
| f2/f | −2.738 | −2.626 | −2.451 | −2.385 | −2.404 |
| f3/f | 2.355 | 2.682 | 2.723 | 2.667 | 2.688 |
| f4/f | −21.501 | −95.702 | −43.630 | −80.354 | −58.647 |
| f5/f | −2.021 | −1.907 | −1.982 | −1.934 | −1.902 |
| f6/f | 31.372 | 316.39 | 188.17 | 1680.0 | 1846.4 |
| V1-V2 | 35.70 | 35.70 | 35.70 | 35.70 | 35.70 |
| V1-V4 | 35.70 | 34.60 | 34.60 | 34.60 | 34.60 |
| V1-V5 | 35.70 | 34.60 | 34.60 | 34.60 | 34.60 |
| OAL/f | 1.165 | 1.162 | 1.162 | 1.162 | 1.162 |
| OAL/f1 | 1.220 | 1.274 | 1.305 | 1.308 | 1.316 |
| f1/f2 | −0.349 | −0.347 | −0.363 | −0.372 | −0.367 |
| f2/f3 | −1.163 | −0.979 | −0.900 | −0.894 | −0.894 |
| BFL/f | 0.168 | 0.243 | 0.245 | 0.243 | 0.240 |
| D1/f | 0.026 | 0.030 | 0.032 | 0.036 | 0.035 |
| R1/f | 0.364 | 0.365 | 0.371 | 0.375 | 0.373 |
| R6/f | 0.966 | 0.964 | 1.259 | 1.293 | 1.273 |
| R9/f | −1.185 | −1.060 | −1.126 | −1.108 | −1.110 |
| FOV | 81.0 | 80.9 | 81.0 | 81.0 | 81.0 |
| FNO | 2.10 | 2.10 | 2.10 | 2.10 | 2.10 |

As set forth above, according to examples, an optical imaging system having high resolution and high brightness may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens comprising a refractive power;
a second lens comprising a refractive power and a convex object-side surface in a paraxial region;
a third lens comprising a refractive power;
a fourth lens comprising a refractive power;
a fifth lens comprising negative refractive power; and
a sixth lens comprising positive refractive power,
wherein the first to sixth lenses are sequentially disposed from an object side toward an imaging plane,
wherein the optical imaging system has a total number of six lenses with refractive power,
wherein a numerical value of a radius of curvature of an object-side surface of the first lens is less than a numerical value of a radius of curvature of an image-side surface of the fifth lens,
wherein an absolute value of a radius of curvature of an object-side surface of the fourth lens is greater than an absolute value of a radius of curvature of an image-side surface of the second lens,
wherein an absolute value of a radius of curvature of an image-side surface of the first lens is greater than an absolute value of a radius of curvature of an object-side surface of the third lens, and
wherein a distance from an image-side surface of the fourth lens to the object-side surface of the fifth lens is greater than a distance from an image-side surface of the fifth lens to an object-side surface of the sixth lens.

2. The optical imaging system of claim 1, wherein the first lens has positive refractive power.

3. The optical imaging system of claim 1, wherein the second lens has negative refractive power.

4. The optical imaging system of claim 1, wherein the fourth lens has negative refractive power.

5. The optical imaging system of claim 1, wherein the first lens has a convex object-side surface.

6. The optical imaging system of claim 1, wherein the second lens has concave image-side surface.

7. The optical imaging system of claim 1, wherein the third lens has a convex object-side surface.

8. The optical imaging system of claim 1, wherein the fifth lens has a convex object-side surface.

9. The optical imaging system of claim 1, wherein the fifth lens has concave image-side surface.

10. An optical imaging system, comprising:
a first lens comprising positive refractive power;
a second lens comprising a convex object-side surface in a paraxial region and a concave image-side surface;
a third lens comprising a concave image-side surface;
a fourth lens comprising a refractive power;
a fifth lens comprising a negative refractive power and a convex object-side surface; and
a sixth lens comprising positive refractive power,
wherein the first to sixth lenses are sequentially disposed from an object side toward an imaging plane,
wherein the optical imaging system has a total number of six lenses with refractive power,
wherein a distance from an image-side surface of the fourth lens to the object-side surface of the fifth lens is greater than a distance from an image-side surface of the fifth lens to an object-side surface of the sixth lens, and
wherein an absolute value of a radius of curvature of an image-side surface of the first lens is greater than an absolute value of a radius of curvature of an object-side surface of the third lens.

11. The optical imaging system of claim 10, wherein OAL/f<1.25, where OAL is a distance from an object-side surface of the first lens to the imaging plane and f is a focal length of the optical imaging system.

12. The optical imaging system of claim 10, wherein −0.7<f1/f2<−0.10, where f1 is a focal length of the first lens and f2 is a focal length of the second lens.

13. The optical imaging system of claim 10, wherein D12/f<0.08, where D12 is a distance from an image-side surface of the first lens to an object-side surface of the second lens and f is a focal length of the optical imaging system.

* * * * *